United States Patent Office 3,050,982
Patented Aug. 28, 1962

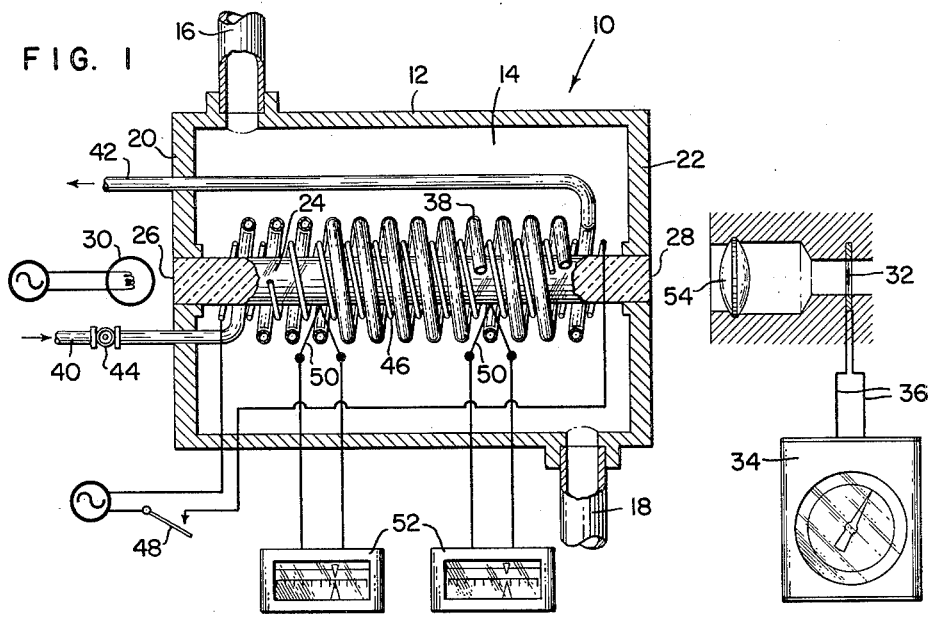
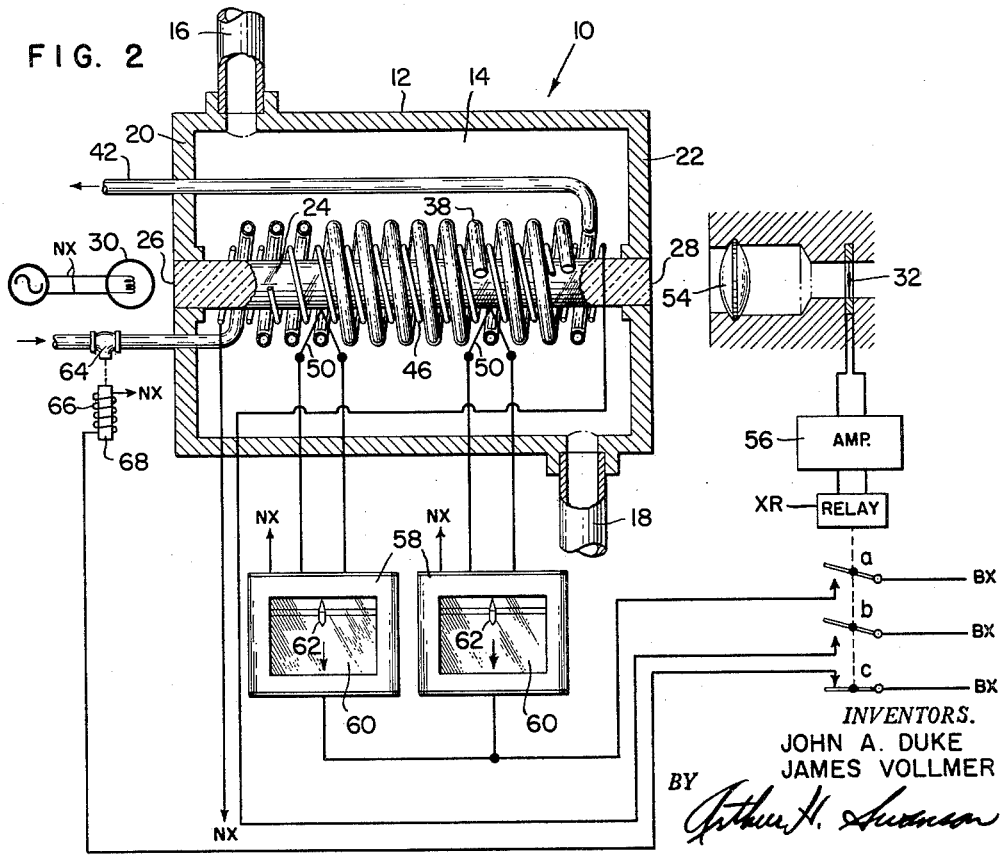

3,050,982
DEW POINT MEASURING APPARATUS
James Vollmer, Philadelphia, and John A. Duke, Roslyn, Pa., assignors to Minneapolis-Honeywell Regulator Company, Minneapolis, Minn., a corporation of Delaware
Filed May 5, 1958, Ser. No. 733,063
16 Claims. (Cl. 73—17)

This invention relates to apparatus for measuring the dew point and particularly to apparatus for measuring the dew point by means of a radiant energy conducting rod. Ordinarily dew point refers to the temperature at which water condenses from the atmosphere. However the dew point measuring method referred to in this application is not necessarily restricted to water alone but rather to measurement of the temperature at which any vapor condenses.

It is well known that the dew point is the temperature at which a condensable vapor will condense out of its atmosphere. The measurement of the dew point is often extremely important as it gives an indication of the amount of condensable vapor presently in a given atmosphere. Moreover, a dew point measuring device can be utilized to measure the relative humidity of the atmosphere.

Heretofore, there have been a number of proposed devices for automatically measuring the dew point. Most of these devices, however, utilized the reduction in specular reflectivity of a mirror on which vapor condensed in order to determine when the dew point had been reached. The present invention utilizes an entirely different principle for determining the dew point.

One object of the present invention is the provision of new and improved apparatus for measuring the dew point.

Another object of the present invention is the provision of new and improved apparatus for measuring the dew point, which apparatus relies on the changes in conductivity of light through a radiant energy guide such as, for instance, an artificial sapphire rod as a consequence of changes in the absorption characteristics and index of refraction when a vapor condenses to a liquid.

In the drawings:
FIG. 1 is a diagrammatic representation in section of apparatus for measuring the dew point embodying one form of the present invention; and
FIG. 2 is a view similar to FIG. 1 illustrating a modification of the present invention.

Referring now to FIG. 1 of the drawings in detail, the dew point measuring apparatus is generally designated by the reference numeral 10. This apparatus includes a housing 12 defining a chamber 14 through which a given atmosphere containing a condensable vapor passes. The chamber 14 is provided with an inlet 16 and an outlet 18 whereby to permit for the circulation of the atmosphere through chamber 14 to provide for continuous readings of the dew point of said atmosphere. Mounted in the side walls 20 and 22 of housing 12 and extending through chamber 14 is a radiant energy guide such as, for instance, a sapphire rod 24 although other transparent highly refractive rods may be used such as, for instance, natural sapphire or quartz. It is to be noted that preferably, the ends 26 and 28 of sapphire rod 24 are flush with the outside surfaces of side walls 20 and 22 of housing 12, although this is not necessary. Disposed adjacent the end 26 of sapphire rod 24 is a source of radiant energy such as, for instance, a light bulb 30 which is energized by any suitable source of electrical energy. Adjacent the end 28 of sapphire rod 24 is a radiant energy detecting device such as, for instance, a thermopile 32. The output of thermopile 32 may be detected by any suitable device such as a meter 34 connected to the thermopile by conductors 36.

Surrounding sapphire rod 24 and spaced therefrom is a helical coil of tubing 38 having an inlet 40 and an outlet 42. Inlet 40 is connected to a source of refrigerant and the flow of the refrigerant through coil 38 may be controlled in any suitable manner such as by a valve 44. Also surrounding the sapphire rod 24 and spaced therefrom is a helical heating coil 46 which may be of the resistance type although other suitable heating means may be employed. In the event an electrical heating means is utilized, then the heating coil 46 may be energized by any suitable source of electrical energy over a control device such as a switch 48. To measure the temperature of the surface of a sapphire rod 24, a pair of thermocouples 50 are disposed close to or in surface-to-surface relation with a sapphire rod 24. The thermocouples may be connected to any suitable indicating device such as meters 52 which are preferably calibrated in thermal degrees, either Fahrenheit, centigrade or Kelvin. It is understood that any suitable temperature measuring device may be employed.

Having described the construction of the dew point measuring apparatus 10 illustrated in FIG. 1, a description of the operation thereof will now be presented. Atmosphere is circulated through chamber 14 by any suitable means such as a pump (not shown). With the atmosphere circulating through the chamber 14, bulb 30 is energized and lighted. Sapphire guide 24, being highly refractive and being surrounded by a gaseous medium of low index of refraction, transmits substantially all of the light entering end 26 of sapphire rod 24 to the end 28 thereof, where the light passes through a window 54 in the thermopile 32 to actuate the thermopile. With conditions stable as to the medium surrounding the sapphire rod 24, the output of the thermopile 32 as measured by meter 34 will be constant.

Valve 44 is now opened to permit refrigerant to pass through coil 38 and then out through outlet 42. The refrigerant commences to cool the atmosphere surrounding the coil 38 and further cools the surface of sapphire rod 24. As the cooling progresses, a point will be reached at which the cooled atmosphere is no longer able to contain all of the condensable vapor therein. Accordingly, the condensable vapor will condense on the surface of the rod 24. Since the index of refraction of the condensed vapor will be different from and greater than the index of refraction of the atmosphere and since the absorption characteristics will be different theretofore surrounding the sapphire rod 24, the amount of radiant energy passing out of the rod and being lost will change. Specifically, any liquid with appropriate absorption and index characteristics which condenses on the peripheral surface of the sapphire rod will cause substantially greater amounts of light to pass out of this peripheral surface of the sapphire rod than would be caused by a gaseous atmosphere surrounding the rod. Accordingly, the output of thermopile 32 will drop drastically and this drop will be indicated by a movement of the indicating needle on meter 34. At the time when the meter records the drop in output of the thermopile 34, the temperature indicating meters 52 should be read and the temperature indicated by them will be the dew point temperature.

After the dew point has been reached, switch 48 may be closed to energize the heating element 46 and valve 44 may be closed to discontinue the supply of refrigerant to the coil 38. The heat supplied by the element 46 will raise the temperature of the atmosphere surrounding sapphire rod 24 and will also raise the temperature of the surface of the sapphire rod. Accordingly, the temperature of the atmosphere will be raised sufficiently so that it may contain the amount of condensable vapor normally in the atmosphere and the vapor theretofore condensed on the surface of the sapphire rod will evaporate and once more become part of the atmosphere in chamber 14. Accordingly, the surface of sapphire rod 24 will clear up and less light will be lost through that surface. Therefore, substantially all of the light entering end 26 of sapphire rod will pass out of end 28 thereof to activate thermopile 32. Accordingly, indicator 34 will return to its normal condition. When this condition has been reached apparatus 10 is ready to make another dew point measurement.

In view of the close proximity of heating element 46 to sapphire rod 24, it is not absolutely necessary to discontinue the supply of refrigerant after each dew point measurement is made. However, the device operates more efficiently from a power consumption viewpoint if the supply of refrigerant is discontinued after the dew point is reached.

The above described apparatus can be completely automatized to make an automatic dew point indicator. An example of such an automatic device is shown in FIG. 2. Referring now to FIG. 2, all of the components of the actual measuring device are precisely the same as those described above with regard to FIG. 1. However, different types of indicating means have been added to automatize the apparatus of FIG. 1. For instance, the output of thermopile 32 is now connected to the input of an amplifier 56 whose output terminals are connected to a control relay XR. Under normal conditions with no dew on the surface of sapphire rod 24, the output of thermopile 32 as amplified by amplifier 36 is sufficient to maintain relay XR in its picked up condition. Furthermore, in lieu of the meters 52 which were connected to the thermocouples 50, chart type indicating devices 58 have been substituted. These devices are well known on the market and include a movable chart 60 and a pen or stylus 62. The pen or stylus is moved transversely of the direction of movement of the chart 60 (see arrow in FIG. 2) in accordance with the input from the thermocouples 50. However, the pens or styli 62 are normally retracted from the paper or chart 60. Upon the supplying of an impulse in a manner described hereinafter, the pen or stylus 62 is depressed to engage the paper 60 and make a mark thereon. Thereafter it is automatically retracted. Accordingly, the point or dot made by the stylus upon engaging the paper 60 indicates a particular temperature. As will be seen hereinafter, that temperature will be the dew point of the gas in chamber 14. One further alteration on the apparatus shown in FIG. 1 to yield the apparatus shown in FIG. 2 is the substitution for manual valve 44 of an automatic valve 64 which is controlled by a solenoid 66 having a plunger 68.

The operation of the apparatus shown in FIG. 2 will now be described. Under normal conditions the temperature of the surface of sapphire rod 24 is sufficiently high to be above the dew point of the condensable vapor in the atmosphere in the chamber 14. Bulb 30 is energized and the light transmitted by the sapphire rod 24 enters through the window 54 of thermopile 32 to energize the thermopile to a predetermined value. Accordingly, the output of amplifier 56 is at a predetermined value sufficiently high to energize relay XR. With relay XR energized, back contacts $a$ and $b$ of relay XR are open and front contact $c$ of relay XR is closed. With back contact $a$ of relay XR open, a circuit actuating the depressing element in temperature indicators 58 is open and, accordingly, the pens or styli 62 are in their raised or non-marking position.

This last mentioned circuit may be traced from terminal BX, over back contact $a$ of relay XR, and the depressing means in indicators 58 in multiple, to terminal NX of the power source. During this time, of course, chart 60 is being advanced in the direction of the arrows in FIG. 2. Furthermore, with back contact $b$ of relay XR open, the energizing circuit to the heating element 46 surrounding sapphire rod 24 is open so that no heat is being supplied to the heating element. With front contact $c$ of relay XR closed, solenoid 66 is energized whereby to actuate plunger 68 so as to open valve 64 and permit the flow of refrigerant through coil 38. Accordingly, the temperature surrounding sapphire rod 24 is being lowered and continues to be lowered until the dew point is reached.

At the time when the dew point is reached, vapor will condense on the surface of sapphire rod 24 and this liquid will cause more light to pass out of the peripheral portion of the sapphire rod than passed out when the surface of the sapphire rod was not coated with liquid. This phenomenon of course is due to the change in the index of refraction of the medium surrounding the sapphire rod as well as its absorption properties. With the amount of light passing out of the end 28 of sapphire rod 24 decreased, the output of thermopile 32 will drop and this drop will be reflected in a drop in the output of amplifier 56 to relay XR. The new level of output of amplifier 56 is insufficient to maintain relay XR in its picked up condition. Accordingly, relay XR will release to close back contacts $a$ and $b$ and open front contact $c$. With back contact $a$ closed, the depressing element or plunger in temperature measuring device 58 will be energized to depress pens 62 and cause them to make a mark on the chart 60. This mark will indicate the dew point temperature since the styli 62 have moved transversely of charts 60 in response to temperature changes as measured by thermocouples 50. Thereafter, by internal means the pens or styli will be returned to their raised condition. Moreover, with back contact $b$ of relay XR closed, energy will be supplied to the heating element 46 by a circuit which may be traced from terminal BX of the power source, over back contact $b$ of relay XR, and the winding of the heating element 46 to terminal NX of the power source. Accordingly, heat will be supplied to the atmosphere surrounding sapphire rod 24 to raise the temperature above that of the dew point and thereby clear up the vapor which has condensed on the surface of sapphire rod 24. Furthermore, with front contact $c$ of relay XR opened, solenoid 66 will be deenergized and plunger 68 will be retracted to close valve 64 and thereby cut off the supply of refrigerant to coil 38. This condition will persist until the vapor which has condensed on the surface of sapphire rod 24 has once again evaporated into the atmosphere in chamber 14, at which time the amount of light passing out of the end 28 of sapphire rod 24 will be restored to the normal amount which will cause thermopile 32 to commence putting out a voltage sufficiently high when amplified by amplifier 56 to cause relay XR to pick up. Upon relay XR picking up, the system is restored to its normal condition and is ready for another measurement of the dew point.

One means for heating the atmosphere surrounding the sapphire rod and the surface of the sapphire rod itself is the coil 38. For instance, the coil 38 can be an evaporator of a heat pump during the cooling cycle. By the operation of external valve means the heat pump operating cycle can be reversed after the dew point has been reached to make coil 38 the condenser of the heat pump. Accordingly, if coil 38 is employed as a heat pump condenser it will act to heat the atmosphere surrounding sapphire rod 24 and further to heat the surface of the sapphire rod itself. Accordingly, the coil 38 serves both the functions of cooling the atmosphere to reach the dew point as well as to heat the atmosphere to a point above the dew point after the dew point has been reached.

From the aforementioned description it will be noted that the present invention discloses a dew point meter that is comprised of a radiant energy source, a light guide, a detector, a heating means, a cooling means and a temperature measuring means wherein the physical basis of this meter is the dependence of loss from the light guide on the refractive index and absorption co-efficient of the medium surrounding it.

What is claimed is:

1. Apparatus for measuring the dew point of an atmosphere containing a condensable vapor wherein the measurement is based on changes in the absorption characteristics and changes in the index of refraction, comprising a highly refractive elongated radiant energy transmitting member adapted to have the external surface extending between its end portions disposed in said atmosphere, radiant energy generating means disposed adjacent one end of said elongated transmitting member and directed thereat, radiant energy sensing means disposed adjacent the opposite end of said elongated transmitting member, means for varying the temperature of said atmosphere adjacent said elongated transmitting member and means for measuring the dew point temperature adjacent the surface of said member that extends between the ends thereof when a substantial, predetermined drop in the amount of radiant energy is sensed by said radiant energy sensing means.

2. Apparatus for measuring the dew point of an atmosphere containing a condensible vapor, comprising a highly refractive elongated radiant energy transmitting member having an outer peripheral portion enveloped by said atmosphere containing said condensible vapor, radiant energy generating means disposed adjacent one end of said elongated transmitting member and directed thereat, radiant energy responsive means disposed adjacent the opposite end of said transmitting member to sense the magnitude of said radiant energy that is passed therethrough, means for cooling said atmosphere adjacent said outer peripheral portion of the transmitting member, means for heating said atmosphere adjacent said outer peripheral portion of the transmitting member and means for measuring the dew point temperature adjacent the peripheral portion of said member when a substantial, predetermined drop in said radiant energy is sensed by said radiant energy responsive means.

3. Apparatus for measuring the dew point of an atmosphere containing a condensible vapor, comprising a highly refractive outer peripheral radiant energy transmitting member having an elngated portion that extends between its ends enveloped by said atmosphere containing said condensible vapor, radiant energy generating means disposed adjacent one end of said elongated transmitting member and directed thereat, radiant energy responsive means disposed adjacent the opposite end of said transmitting member to sense the magnitude of said radiant energy that is passed therethrough, means for cooling said atmosphere adjacent said outer peripheral portion of the transmitting member, means separate and distinct from said cooling means for heating said atmosphere adjacent said outer peripheral portion of the transmitting member and means for measuring the dew point temperature adjacent the peripheral portion of said member when a substantial, predetermined drop in said radiant energy is sensed by said radiant energy responsive means.

4. Apparatus for measuring the dew point of an atmosphere containing a condensible vapor, comprising a longitudinally extending rod of radiant energy transmitting material having a high index of refraction adapted to have a peripheral surface thereof extending between its ends disposed in said atmosphere, radiant energy generating means disposed adjacent one end of said rod and directed thereat, radiant energy responsive means disposed adjacent the opposite end of said rod to sense the magnitude of said radiant energy that is passed therethrough, means for lowering the temperature of said atmosphere adjacent the peripheral surface of said rod and means for measuring the temperature adjacent the said peripheral surface of said rod especially when a substantial, predetermined drop in said radiant energy is sensed by said radiant energy responsive means.

5. Apparatus for measuring the dew point of an atmosphere containing a condensible vapor, comprising a longitudinally extending sapphire rod adapted to have substantially the entire peripheral portion thereof extending between its ends disposed in said atmosphere, a radiant energy source disposed adjacent one end of said rod and directed thereat, radiant energy responsive means disposed adjacent the opposite end of said rod to sense the magnitude of said radiant energy that is passed therethrough, means for lowering the temperature of said atmosphere adjacent the said peripheral portion of the rod and means for measuring the dew point temperature adjacent the said peripheral surface of said rod when a substantial, predetermined drop in said radiant energy is sensed by said radiant energy responsive means.

6. Apparatus for measuring the dew point of an atmosphere containing a conductive vapor, comprising a highy refractive radiant energy transmitting member adapted to have a peripheral surface thereof extending between its ends disposed in said atmosphere, a radiant energy source disposed adjacent one end of said transmitting member and directed thereat, a thermopile disposed adjacent the opposite end of said transmitting member to sense the magnitude of said radiant energy that is transmitted through and out of said transmitting member, means for lowering the temperature of said atmosphere adjacent said peripheral surface of said transmitting member and means for measuring the dew point temperature adjacent the surface of said member when a substantial, predetermined drop in said radiant energy is sensed by the thermopile.

7. Apparatus for measuring the dew point of an atmosphere containing a condensible vapor, comprising a highly refractive radiant energy transmitting member adapted to have a peripheral portion thereof between its ends disposed in said atmosphere, radiant energy generating means disposed adjacent one end of said elongated transmitting member and directed thereat, radiant energy responsive means disposed adjacent the opposite end of said elongated transmitting member to sense the magnitude of the radiant energy that is passed therethrough, a tubular coil surrounding the said peripheral portion of the transmitting member and spaced therefrom for passing a refrigerant therethrough to cool said atmosphere to a temperature below the dew point of said atmosphere, means for heating said atmosphere to a temperature above the dew point of said atmosphere and means for measuring the dew point temperature adjacent the peripheral portion of said transmitting member when a substantial, predetermined drop in said radiant energy is sensed by said radiant energy responsive means.

8. Apparatus for measuring the dew point of an atmosphere containing a condensible vapor, comprising a highly refractive elongated radiant energy transmitting member having a peripheral portion between its ends adapted to be enveloped by said atmosphere, radiant energy generating means disposed adjacent one end of said transmitting member and directed thereat, radiant energy responsive means disposed adjacent the opposite end of said transmitting member to sense the magnitude of the radiant energy that is passed therethrough, means for cooling the atmosphere adjacent the peripheral portion of said transmitting member, an electric heating coil disposed about the peripheral portion of said transmitting member and spaced therefrom for heating said atmosphere to a temperature above said dew point and means for measuring the temperature adjacent the peripheral surface of said member especially when a substantial, predetermined drop in said radiant energy is sensed by said radiant energy responsive means.

9. Apparatus for measuring the dew point of an atmosphere containing a condensible vapor, comprising a highly refractive elongated radiant energy transmitting member between its ends adapted to be disposed in said atmosphere, radiant energy generating means disposed adjacent one end of said transmitting member and directed thereat, radiant energy responsive means disposed adjacent the opposite end of said transmitting member to sense said radiant energy that is passed therethrough, a tubular coil surrounding a portion of said elongated transmitting member that is located between the ends of said member and spaced therefrom for passing a refrigerant therethrough to cool said atmosphere surrounding said transmitting member to a temperature below the dew point of said atmosphere, an electric heating coil disposed about a portion of said transmitting member that is located between the ends of said member and spaced therefrom for heating said atmosphere to a temperature above said dew point and means for measuring the temperature adjacent a surface of said member that is located between the ends of said member particularly when a substantial, predetermined drop in said radiant energy is sensed by said radiant energy responsive means.

10. Apparatus for measuring the dew point of an atmosphere containing a condensible vapor, comprising a longitudinally extending sapphire rod adapted to have its outer circumferential surface disposed in said atmosphere, a radiant energy source disposed adjacent one end of said rod and directed thereat, a thermopile disposed adjacent the opposite end of said rod to sense the magnitude of said radiant energy that is transmitted through and out of said rod, means for lowering the temperature of said atmosphere adjacent said rod below said dew point and means for measuring the dew point temperature adjacent a portion of the outer circumferential surface of said rod when a substantial, predetermined drop in said radiant energy is sensed by said thermopile.

11. Apparatus for measuring the dew point of an atmosphere containing a condensible vapor, comprising a longitudinally extending sapphire rod adapted to be disposed in said atmosphere, a radiant energy source disposed adjacent one end of said rod and directed thereat, a thermopile disposed adjacent the opposite end of said rod to sense changes in the magnitude of said radiant energy that is transmitted through and out of said rod, a tubular coil surrounding said rod and spaced therefrom for passing a refrigerant therethrough to cool said atmosphere to a temperature below the dew point of said atmosphere, an electric heating coil disposed about said rod and spaced therefrom for heating said atmosphere to a temperature above said dew point and means for measuring the dew point temperature adjacent the surface of said rod when a substantial, predetermined drop in said radiant energy is sensed by said thermopile.

12. Apparatus for measuring the dew point of an atmosphere containing a condensible vapor, comprising a longitudinally extending sapphire rod adapted to be disposed in said atmosphere, a radiant energy source disposed adjacent one end of said rod and directed thereat, a thermopile disposed adjacent the opposite end of said rod to sense changes in the magnitude of said radiant energy that is transmitted through and out of said rod, a tubular coil surrounding said rod and spaced therefrom for passing a refrigerant therethrough to cool said atmosphere to a temperature below the dew point of said atmosphere, an electric heating coil disposed about said rod and spaced therefrom for heating said atmosphere to a temperature above said dew point, means for controlling the flow of refrigerant through said tubular coil, means for controlling the energization of said heating coil and means for measuring the dew point temperature adjacent the surface of said rod when a substantial, predetermined drop in said radiant energy is sensed by said thermopile.

13. Apparatus for measuring the dew point of an atmosphere having a condensible vapor, said apparatus comprising a housing defining a chamber having an inlet and outlet for the passage of said atmosphere therethrough, a sapphire rod extending through said chamber and having its ends disposed outside said housing, a source of radiant energy disposed outside of said housing and directed at one end of said rod, a thermopile disposed outside of said housing adjacent the other end of said rod to sense changes in the magnitude of said energy that is emanating therefrom, a tubular coil disposed within said chamber and surrounding said rod in spaced relation thereto for circulating a refrigerant to cool the atmosphere in said chamber to a temperature below the dew point, an electric heating element disposed within said chamber for heating the atmosphere therein to a temperature above the dew point, and a thermocouple disposed adjacent the rod surface within said chamber for measuring the dew point temperature adjacent said rod surface when a substantial, predetermined drop in said radiant energy is sensed by said thermopile.

14. Apparatus for measuring the dew point of an atmosphere containing a condensible vapor, comprising an elongated highly refractive elongated light transmitting member having outer peripheral portion between its ends adapted to be disposed in said atmosphere, light generating means disposed adjacent one end of said elongated light transmitting member and directed thereat, light responsive means disposed adjacent the opposite end of said transmitting member to sense the light that is passed therethrough, means for cooling the atmosphere adjacent said peripheral portion of said elongated transmitting member and means for measuring the dew point temperature adjacent the peripheral portion of said member when a substantial, predetermined drop in the intensity of light is sensed by said light responsive means.

15. Apparatus for measuring the dew point of an atmosphere containing a condensible vapor wherein the physical basis of said apparatus is the dependence of loss in radiant energy from a highly refractive elongated radiant energy light guide on the refractive index and the absorption coefficient of the vapor surrounding said guide, comprising radiant energy generating means disposed adjacent one end of said elongated light guide and directed thereat, said elongated light guide having an outer peripheral portion extending between its end portions completely enveloped by said atmosphere containing said condensible vapor, radiant energy responsive means disposed adjacent the opposite end of said transmitting member to sense the magnitude of said radiant energy that is passed therethrough, means for lowering the temperature of said atmosphere adjacent the said outer peripheral portion of said transmitting member, and means for measuring the temperature adjacent the said peripheral portion of said member when a substantial, predetermined drop in the said radiant energy is sensed by said radiant energy responsive means.

16. Apparatus for measuring the dew point of an atmosphere containing a condensible vapor, comprising an elongated highly refractive elongated light transmitting member having an outer peripheral portion between its ends adapted to be disposed in said atmosphere, light generating means disposed adjacent one end of said elongated light transmitting member and directed thereat, a thermopile disposed adjacent the opposite end of said transmitting member to sense the light that is passed therethrough, means for cooling the atmosphere adjacent said peripheral portion of said elongated transmitting member, and means for measuring the dew point temperature adjacent the peripheral portion of said member when a substantial, predetermined drop in the intensity of light is sensed by said thermopile.

References Cited in the file of this patent

UNITED STATES PATENTS

| | | |
|---|---|---|
| 2,536,111 | Van Dyke | Jan. 2, 1951 |
| 2,697,933 | Donath | Dec. 28, 1954 |
| 2,733,594 | Silverman | Feb. 7, 1956 |
| 2,829,363 | Obermaier et al. | Apr. 1, 1958 |
| 2,897,485 | Johnson | July 28, 1959 |